Figure 1A:
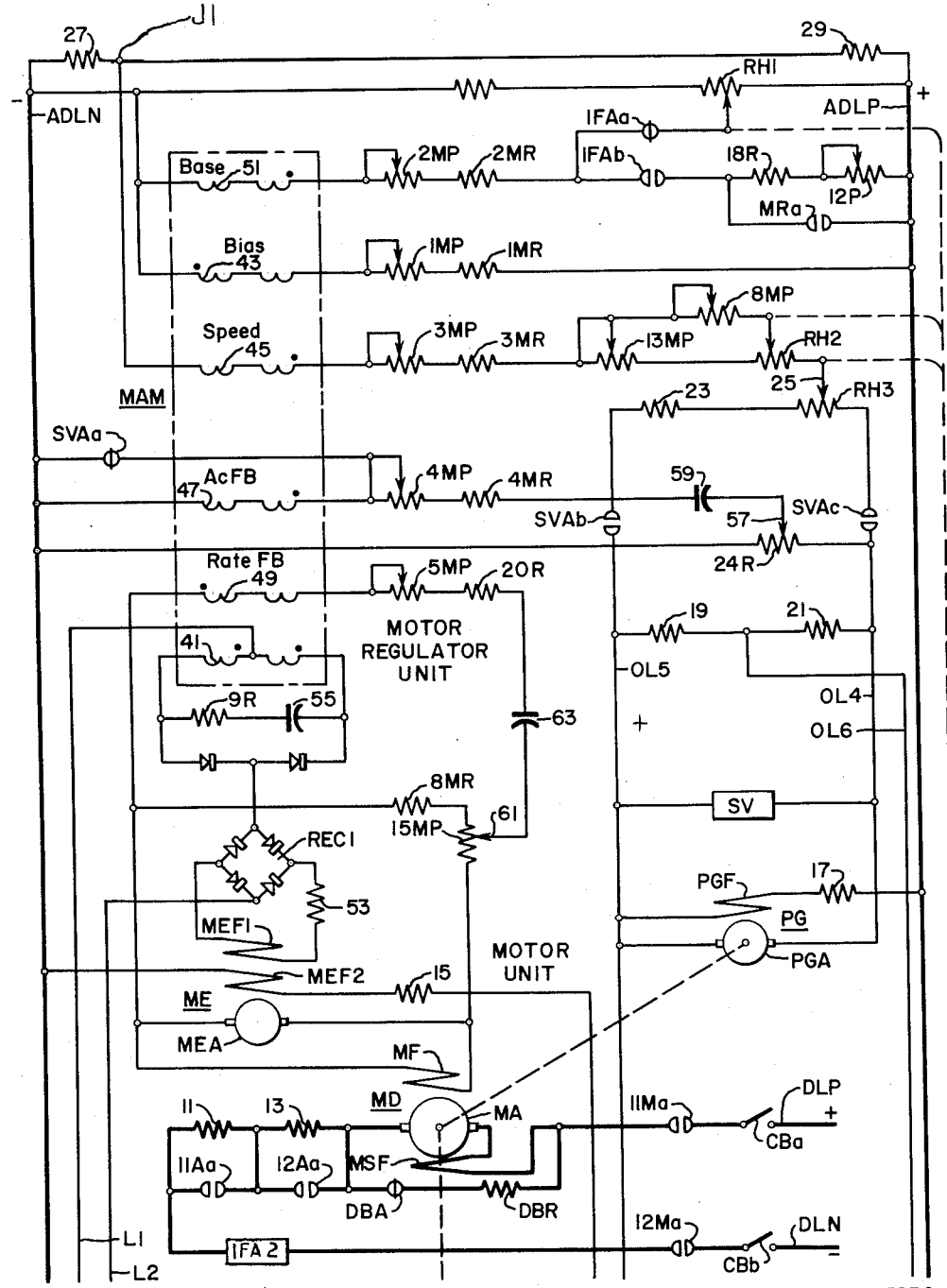

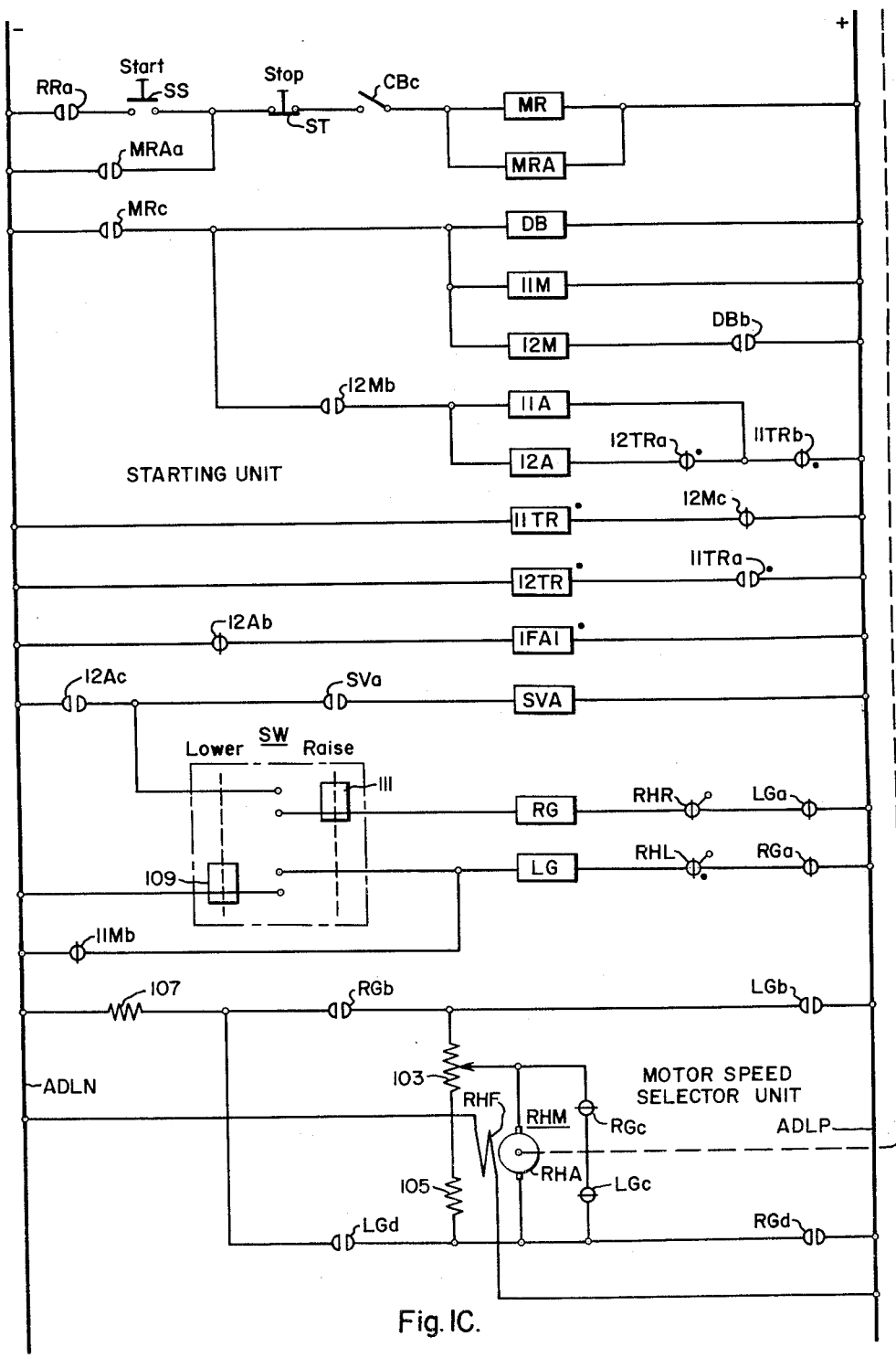
Fig. IC.

United States Patent Office 2,989,684
Patented June 20, 1961

2,989,684
POWER SUPPLY APPARATUS
Orlando U. Smerillo, Scott Township, Allegheny County, Pa., and Donald E. Abell, Buffalo, N.Y., assignors to Westinghouse Electric Corporation, East Pittsburgh, Pa., a corporation of Pennsylvania
Filed Nov. 28, 1958, Ser. No. 777,023
11 Claims. (Cl. 322—23)

This invention relates to the power supply art and has particular relation to methods and apparatus for controlling the supply of power to variable-speed drives.

In its specific aspects, this invention concerns itself with the supply of power to pluralities of table roll motors in a strip rolling mill. Such motors may be three-phase alternating-current motors having a power output of about three horse-power and typically it may be necessary to drive 30 or 60 of such motors. It is desirable that facilities be provided for setting the speed of the table roll motors over a substantial range, for example, of the order of 3 to 1. To achieve this object the motors are driven from a common motor-driven alternator, the frequency of which is set by setting the speed of the driving motor to set the speed of the table roll motors. To avoid damage to the table roll motors, it is desirable that the voltage output of the alternator be properly correlated to its frequency and it is an object of this invention to provide a method and apparatus for so correlating the output voltage of a variable frequency alternator with its frequency as to avoid damage to the load being supplied.

Another object of this invention is to provide power-supply apparatus for a variable-speed drive including an alternator, the voltage output of which shall be regulated so that the alternator shall deliver the same number of volts per cycle over substantially its whole operating frequency range.

A more specific object of this invention is to provide apparatus including such an alternator which over its frequency range shall produce the same number of volts per cycle substantially independently of the load on the alternator.

A further object of this invention is to provide a method of operating a power-supply system including an alternator driven by a variable-speed motor so that the volts per cycle derivable from the alternator over its operating range of frequencies shall be maintained substantially constant and independent both of the load on the alternator and the speed setting of the motor.

In accordance with the specific aspects of this invention, a power supply unit is provided which includes an alternator driven by a variable speed motor preferably of the direct-current type. A voltage proportional to the speed of this motor is derived, for example, from a tachometer driven by this motor. The speed of the motor is set by comparing a selected portion of the speed-proportional voltage with a reference potential and correspondingly controlling the excitation of the motor. The motor is provided with regulating means which maintains the speed at the desired setting.

The motor speed is set and regulated by varying the motor shunt field. To correct for change in gain over the range of speed over which the motor is varied a correction dependent on the speed setting is introduced into the regulating loop.

The voltage of the alternator is set by comparing the voltage output of the alternator with a voltage proportional to the speed of the direct-current motor and controlling a shunt field of the alternator in accordance with the algebraic difference between the alternator voltage and the speed-proportional voltage. The comparison is effected in dependence upon the setting of the motor speed and also on the loading of the alternator. The correction for loading is required to suppress the droop in alternator output voltage as the loading is increased. The correction factor dependent on the motor speed is introduced to correct for the change in gain of the alternator over the frequency range. In a typical situation the frequency range may be of the order of 3 to 1. Over this range the gain of the alternator changes over a range of 3 to 1. The setting of the regulating signal is dependence upon the range corrects for the change in gain. The alternator is thus so regulated that it delivers substantially the same number of volts per cycle over the frequency range of the alternator because the alternator voltage is determined substantially only by the speed at which it is driven.

Figure 1B:
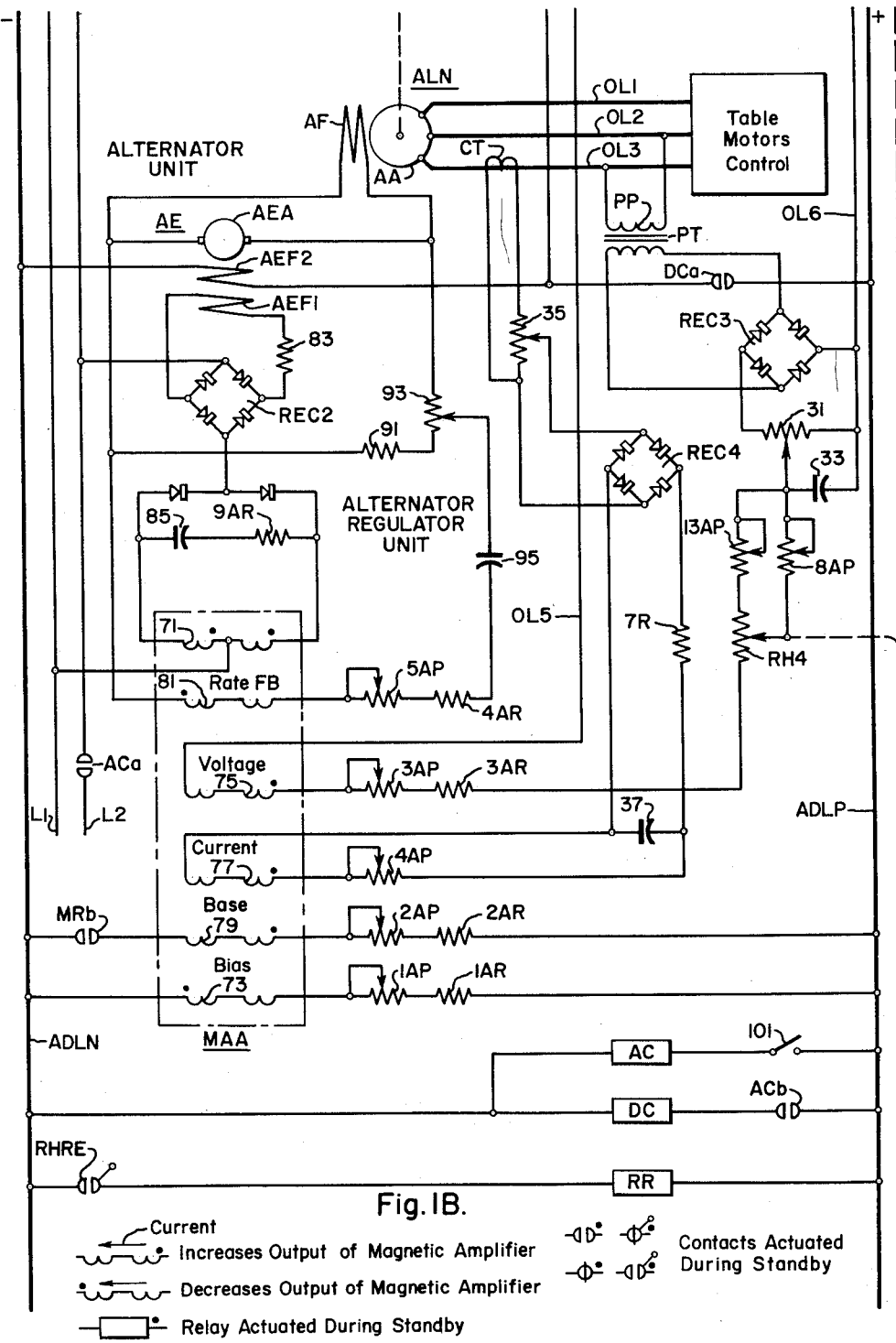

The novel features considered characteristic of this invention are disclosed generally above. The invention itself both as to its organization and as to its method of operation, together with additional objects and advantages thereof, will be understood from the following description of the specific embodiment when read in connection with the accompanying drawings, in which:

FIGURES 1A, 1B and 1C together constitute a schematic of the invention.

Description

The apparatus shown in the drawings includes a Motor Unit, an Alternator Unit, a Motor Regulator Unit, an Alternator Regulator Unit, a Starting Unit, and a Motor Speed Selector Unit. This apparatus is supplied from direct-current power conductors DLP and DLN and from alternating-current conductors L1 and L2. There are auxiliary conductors ADLP and ADLN for supplying power to the various control components. In the usual practice of this invention, the Motor Unit supplies substantial power and the conductors DLP and DLN should be capable of supplying 700 to 1000 volts.

The Motor Unit includes the drive motor MO which may be capable of delivering substantial power of the order of 300 to 600 horsepower and which has an armature MA, shunt field MF and a series field MSF. The armature MA is adapted to be supplied from the conductors DLP and DLN through disconnects or circuit-breaker contacts CBa and CBb, the front contacts 11Ma and 12Ma of master contactors 11M and 12M, controlled by the Starting Unit, one of the two coils 1FA2, of the field-acceleration relay 1FA and the series field MSF. During starting, resistors 11 and 13 are connected in this supply circuit in series with the armature MA. These resistors 11 and 13 are adapted to be shunted out by front contacts 11Aa and 12Aa of relays 11A and 12A controlled by the Starting Unit. In the quiescent condition of the motor MO, the armature MA and the field MSF are shunted by a dynamic braking circuit including resistance DBR and back-contact DBa of relay DB controlled by the Starting Unit.

The speed of the motor MO is controlled by controlling the supply of current to the shunt field winding MF. This control is effected by an exciter ME having shunt field windings MEF1 and MEF2. The shunt field winding MEF1 is supplied from the Motor Regulator Unit in dependence upon the desired operation of the exciter ME. The field winding MEF2 is adapted to be supplied through a resistor 15 from conductors ADLP and ADLN through front contact DCa of a relay DC in the Starting Unit.

A potential dependent on the speed of the motor MO is derived from a pilot generator or tachometer PG driven by the armature MA. The pilot generator PG has an armature PGA and a field winding PGF. The field winding PGF is supplied from conductors ADLP and ADLN through a resistor 17. The armature PGA is shunted by the coil of a relay SV which operates when the motor MO has attained a predetermined speed which is called the base speed. Essentially the base speed is at which the control of the motor MO starts. In the preferred practice of this invention the settings of the motor MO driving operation are at higher speeds than base speeds. The armature PGA is also shunted by a variable resistor 24R from which a signal for suppressing excessive acceleration of the motor MO is derivable.

The pilot generator PG has output conductors OL4 and OL5 connected across the armature PGA. In the usual operation of the apparatus OL4 is electrically positive and OL5 negative. OL5 is at the same potential as conductor ADLN, the negative conductor of the supply ADLP–ADLN. Potentials for control purposes are derived from conductors OL4 and OL5 directly and also through the contacts SVA$b$ and SVA$c$ of the relay SVA in the Starting Unit. A pair of fixed resistors 19 and 21 are connected across conductors OL4 and OL5 forming a voltage divider from which a signal dependent on the speed of the motor MO is derivable between conductors OL5 and OL6 for controlling the Alternator Unit. In addition, a rheostat RH3 and a resistor 23 are adapted to be connected between conductors OL4 and OL5 through the front contacts SVA$b$ and SVA$c$. This rheostat RH3 is driven by a motor RHM in the Motor Speed Selector Unit and enables the operator to set the speed at which the motor MO is operated. The potential derivable from rheostat RH3 between its slider 25 and OL5 is compared with a reference potential derivable at the junction J1 of a pair of resistors 27 and 29 connected between ADLP and ADLN, and this comparison serves for regulating the speed of the motor MO at any setting. In the comparison circuit J1 and the slider 25 are electrically positive relative to ADLN.

A plurality of additional rheostats RH1, RH2 and RH4 are driven in tandem with RH3 by the motor RHM. The rheostat RH2 is connected in the comparison circuit and serves to correct for saturation of the field MF. The rheostat RH1 through the Motor Regulator Unit serves to set magnitude of the field MF which determines the base speed in dependence upon the setting of RH3. The rheostat RH4 introduces a factor dependent on the setting of the rheostat RH3 in the alternator voltage control circuit of the Alternator Regulator Unit.

The Alternator Unit includes an alternator ALN having the capability of supplying the desired number of table roll motors. For example, where approximately 30 motors are to be supplied, the alternator may have a 110.8 volts, 382 kva. rating; where 60 motors are to be supplied a 230 volt, 738 kva. alternator may be used.

The alternator ALN includes an armature AA and shunt field AF, the excitation of which is varied to vary the output voltage of the alternator ALN. The alternator ALN has output conductors OL1, OL2, and OL3 connected to the armature AA through which the alternating current roll motors are supplied. The shaft of the amature AA is connected to be driven by the shaft of the armature MA.

The shunt field excitation of the alternator ALN varied by an exciter AE which has shunt field windings AEF1 and AEF2. Shunt field winding AEF1 is connected to be supplied from the Alternator Regulator Unit. Shunt field winding AEF2 is adapted to be connected between conductors ADLP and ADLN through the contact DC$a$. A signal proportional to the voltage of the armature AA is derivable between conductors OL2 and OL3 through transformer PT, the primary PP of which is connected to the conductors OL2 and OL3 and the secondary PS of which supplies a variable resistor 31 through a rectifier REC3. A filtering capacitor 33 is connected across the variable resistor 31.

A signal proportional to the loading of the alternator ALN is derivable from a current transformer CT connected to conductor OL3 which supplies a variable resistor 35. The variable resistor 35 is connected to supply a rectifier REC4, the direct potential of which is impressed on a filtering capacitor 37 through a resistor 7R.

The Motor Regulator Unit includes a magnetic amplifier MAM. This amplifier has output windings 41, bias windings 43, speed responsive windings 45, acceleration feedback windings 47, rate feedback windings 49, and windings 51 for setting the base speed of motor MO. The output windings 41 are adapted to be supplied from conductors L1 and L2 through contacts AC$a$ of contactor AC. Through these windings the field winding MEF1 of the exciter ME is supplied through the usual self-biasing rectifier REC1 and through a resistor 53. A capacitor 55 and a resistor 9R are connected across the output windings to suppress ripple and smooth the wave form of the output. The bias windings 43 are connected between conductors ADLP and ADLN through a resistor 1MR and a variable resistor 1MP. The base windings 51 are connected to be supplied in several circuits depending on the state of the apparatus. In one setting of the apparatus the base windings 51 are adapted to be supplied from conductors ADLP and ADLN through a part of the resistor RH1, back contacts 1FA$a$ of the relay 1FA, resistor 2MR and variable resistor 2MP. In another setting the base windings 51 are adapted to be supplied through a variable resistor 12P, a resistor 18R, front contact 1FA$b$, the fixed resistor 2MR and the variable resistor 2MP. The resistors 12P and 18R are adapted to be shunted out by front contact MR$a$ of the master relay MR in the Starting Unit when the apparatus is being started. The speed windings 45 are adapted to be supplied from the algebraic difference between the reference potential derivable at the junction J1 and the speed responsive potential derivable at slider 25. When the contacts SVA$b$ and SVA$c$ are closed, the speed windings 45 are connected in the circuit extending from OL5 through the fixed resistor 23, the variable resistor RH3, a network consisting of the variable resistor RH2 and variable resistors 8MP and 13MP, the fixed resistor 3MR, the variable resistor 3MP to the junction J1 and through resistor 27 and ADLN to OL5. This circuit includes the potential between the slider 25 of resistor RH3 and conductor OL5 and the opposite polarity potential across the resistor 27. The reference potential is adjusted for saturation of the field of motor MO by setting RH2 when RH3 is set; the lower the potential setting 25–OL5 the higher the resistance RH2.

During the standby condition of the apparatus, the acceleration feedback windings 47 are short circuited by back contacts SVA$a$. During operation the acceleration windings are connected to the slider 57 of resistor 24R through a capacitor 59, fixed resistor 4MR and variable resistor 4MP. The potential between OL5 and the slider 57 is thus impressed through the capacitor 59 on the acceleration windings and transmits a signal through these windings which tends to suppress any tendency of the motor MO to accelerate excessively. The rate feedback windings 49 are supplied in dependence upon the potential across the armature MEA from a resistor 8MR and a variable resistor 15MP connected across this armature. The potential between the slider 61 of resistor 15MP and one terminal of the armature MEA is impressed across the rate feedback windings 49 through a capacitor 63, a fixed resistor 20R and a variable resistor 5MP. The ampere turns through the rate feedback windings 49 tend to suppress any tendency of the exciter output to vary at an excessive rate.

The Alternator Regulator Unit includes a magnetic amplifier MAA. This amplifier has output windings 71, bias windings 73, voltage windings 75, current windings 77, base windings 79 for setting the base voltage and rate feedback windings 81. The field winding AEF1 is adapted to be supplied from conductors L1 and L2 through contacts ACa, a resistor 83 and the usual self-biasing rectifier REC2. These output windings are shunted by a resistor 9AR in series with a capacitor 85 to suppress ripple and smooth the wave form of the output.

The bias windings 73 are connected between conductors ADLP and ADLN through a fixed resistor 1AR and a variable resistor 1AP. The base windings 79 are adapted to be connected between conductors ADLP and ADLN through a fixed resistor 2AR, a variable resistor 2AP and front contacts MRb. The voltage windings 75 are supplied in dependence upon the difference between the pilot generator voltage derivable between OL6 and OL5, which is determined by the speed of the motor MO and the voltage output of the alternator, which is derivable from the resistor 31. For this purpose the voltage windings 75 are connected in a circuit extending from conductor OL5 through the windings, variable resistor 3AP, resistor 3AR, variable resistor RH4, variable resistor 8AP and 13AP in parallel, the resistor 31 to OL6. It is seen that this circuit includes the potential between OL6 and OL5 and the opposite polarity potential across 31 dependent on the alternator voltage. For the variation in the gain of the alternator ALN over the 3 to 1 range of variation of frequency, the variable resistor RH4 is set with the resistor RH3 and introduces the gain correction; the resistance of RH4 in series with 31 is increased as the resistance between slider 25 and OL5 is decreased.

The current windings 77 are energized through the resistor 4AP by the potential across the capacitor 37 charged from REC4. This potential is dependent on the loading of the alternator and introduces a correction in the regulation for the loading. The rate feedback windings 81 are supplied with a potential derivable from a fixed resistor 91 and a variable resistor 93 connected across the armature AEA. This potential is impressed through a capacitor 95, a fixed resistor 4AR and a variable resistor 5AP.

The Starting Unit includes the master relays MR and MRA, the dynamic braking relay DB, the contactors 11M and 12M, the relays 11A and 12A which control the resistance in series with the armature MA, the timing relays 11TR and 12TR, the coil 1FA1 of the field acceleration relay 1FA and the starting relay SVA. The Starting Unit also includes the contactors AC and DC and the relay RR.

The master relay MR has front contacts MRa, MRb and MRc. The master relay MRA has front contacts MRAa. The dynamic braking relay DB has back contact DBa and front contact DBb. The contactor 11M has front contact 11Ma and back contact 11Mb. The contactor 12M has front contacts 12Ma and 12Mb and back contact 12Mc. The relay 11A has front contact 11Aa; the relay 12A has front contacts 12Aa and 12Ac and back contact 12Ab. The relay 11TR has front contact 11TRa and back contact 11TRb. The relay 12TR has back contact 12TRa. The relay 1FA has front contact 1FAb and back contact 1FAa. These contacts are actuated on energization of either of the coils 1FA1 or 1FA2. The relay SVA has front contacts SVAb and SVAc and back contact SVAa. The contactor AC has front contacts ACa and ACb. The contactor DC has front contacts DCa. The relay RR has front contacts RRa.

The coils of relays MR and MRA are adapted to be supplied in parallel from conductors ADLP and ADLN through front contact RRa, a start switch SS, a stop switch ST and disconnect or circuit breaker contact CBc. The coils of the relays MR and MRA are adapted to be locked in through front contact MRAa. As a preliminary to the starting of the apparatus, the relay RR must be actuated. The coil of this relay is adapted to be connected between conductors ADLP and ADLN through limit switch RHRE which is closed only when the rheostat motor RHM has set the resistors RH1 through RH4 in the lowest motor-speed position.

The coils of the relay DB and contactor 11M are adapted to be energized from conductors ADLP and ADLN through front contact MRc. The coil of contactor 12M is adapted to be energized through front contact MRc and front contact DBb. The coil of relay 11A is adapted to be energized through front contact MRc, front contact 12Mb and back contact 11TRb. The coil of 12A is adapted to be energized through the same contacts and in addition through back contact 12TRa. The coil of 11TR is energized through back contact 12Mc. The coil of 12TR is adapted to be energized through front contacts 11TRa. The coil 1FA1 of relay 1FA is energized through front contact 12Ab. The coil of relay SVA is adapted to be energized through front contact 12Ac and front contact SVAa. The coil of contactor AC is adapted to be energized from conductors ADLP and ADLN through a disconnect 101. The coil of contactor DC is adapted to be energized through front contact ACb.

The Motor Speed Selector Unit includes the motor RHM, a switch SW and relays RG and LG. The motor RHM has an armature RHA and a field winding RHF. The field winding RHF is connected between conductors ADLP and ADLN. The switch SW is of the drum type and has a lower position in which the speed of the motor MO is decreased and a raised position in which the speed of the motor MO is increased. The relay RG has back contacts RGa and RGc and front contacts RGb and RGd. The relay LG has back contacts LGa and LGc and front contacts LGb and LGd. The armature RHA is shunted by a variable resistor 103 and a fixed resistor 105. In the quiescent state of the apparatus, the armature RHA is also shunted by back contacts RGc and LGc and is incapable of being energized. When the speed of the motor MO is to be increased, the back contact RGc is opened and, in addition, the motor is supplied from ADLP and ADLN through front contact RGd, the armature RHA, the variable resistor 103, front contact RGb and a fixed resistor 107. This causes the armature RHA to rotate in a direction such as to decrease the potential between the slider 25 of variable resistor RH3 and conductor OL5 when front contact SVAb is closed. Because of the manner in which the speed windings of amplifier MAM are connected, the resulting effect is to weaken the field produced by MF and to increase the speed of the motor. To compensate for the saturation of the field windings MF, the resistance RH2 is at the same time increased. In addition, the resistance of the part of RH1 in series with the base windings 51 is increased to introduce a correction in the ampere turns of the base windings. Further, the resistance RH4 in series with the voltage windings 75 of amplifier MAA is increased to compensate for the change in gain of the alternator AE as the motor speed changes. When the motor speed is to be decreased, the armature RHA is connected in a circuit extending from conductor ADLN through the fixed resistor 107, the front contact LGd, the armature RHA, the variable resistor 103, the front contact LGb. The changes in the variable resistors RH1 through RH4 are then the converse of the above-described changes.

The relay LG is connected in a circuit extending from conductor ADLP through back contact RGa, normally closed limit switch RHL, coil of LG and back contact 11Mb. The limit switch RHL opens when the motor RHM has set the rheostats RH1 through RH4 in the lowest-speed positions. The coil of the relay LG is also adapted to be connected between ADLP and ADLN in the "lower" position of the drum switch SW through the lower contact 109 of SW, coil LG, limit switch RHL, back contact RGa. In the "raise" position of the switch SW the coil of the relay RG is adapted to be connected in a circuit extending from ADLP through back contact LGa, a limit switch RHR, coil RG, the "raise" contact 111 of SW and front contact 12Ac. RHR is opened in the extreme raised position.

Standby

In the standby condition of the apparatus, the conductors ADLP and ADLN and L1 and L2 are energized. In addition, the disconnects or circuit breaker contacts CBa, CBb and CBc are closed, and the disconnect in series with the coil of the contactor AC is closed. The contactor AC is then actuated and the contactor DC is actuated through the front contacts ACb of AC. The output windings 41 and 71 of the amplifiers MAM and MAA are then supplied with power. Ampere turns are also supplied through the bias windings of these amplifiers. These ampere turns tend to reduce the outputs of the amplifiers MAM and MAA and are usually set so that these outputs are at cutoff. Since the amplifiers are at cutoff, the fields MEF1 and AEF1 are deenergized. Since contacts DCa are closed, the fields MEF2 and AEF2 are energized. If the variable resistors RH1 through RH4 are not in the lowest-speed position, limit switch RHRE is open and relay RR deenergized. Relays MR and MRA are then deenergized and relays DB, 11M, 12M, 11A, and 12A are deenergized. Relay 11TR is energized through 12Mc and relay 12R through 11TRa. The coil 1FA1 is energized so that the base windings 51 of amplifier MAM are energized through 12P, 18R, 1FAb, 2MR2, and 2MP. The ampere turns through the base windings 51 counteracts the ampere turns through the bias windings 43 but the output of MAM is in this setting such that initially field MFE1 is weak. The output of ME is then low and field MF is weak. But MA is deenergized, 11MA and 12MA being open.

Also, if the resistors RH1 through RH4 are not in the lowest-speed positions, limit switch RHL is closed and relay LG is actuated moving these resistors to the lowest-speed positions. When the resistors reach the lowest-speed positions RHL opens deenergizing relay LG and RHRE closes energizing RR. MR and MRA are now conditioned to be actuated on the closing of push button SS.

With ACa closed the output windings of amplifier MAA are energized but MAA is held at cut-off by the ampere turns through the bias windings 73. The base windings 79 are deenergized at MRb and the alternator ALN is supplying no current. There is no potential across capacitor 37, resistor 31 or between OL6 and OL5. No current flows through the voltage, current, current or rate feedback windings 75, 77, 81.

Operation

To start the operation push button SS is closed actuating master relays MR and MRA. These relays are locked in through MRAa. The actuation of MR causes MRc to close actuating DB and 11M, and following the closing of DBb of DB, 12M. The supply circuit through the armature MA is then closed and the dynamic braking circuit across the armature MA is opened at DBa. The variable resistor 12P and the fixed resistor 18R are short circuited by contact MRa. Since 1FA1 is initially actuated 1FAb remains closed and 1FAa open so that the base windings 51 of amplifier MAM are supplied with the maximum ampere turns and the field of MEF1 is correspondingly set. The field MF is then set so that if the motor MO were fully energized (11 and 13 shorted) it would be at base speed.

In the Alternator Regular Unit MRb closes so that ampere turns are supplied to the base windings 79 to counteract the blocking effect of the bias windings 73. Initially the motor MO is at rest or operating at a zero speed so that the output of PG and the potential between OL6 and OL5 is low. Initially then any voltage build-up in the alternating AA is to an extent counteracted by the voltage across resistor 31 which causes counteracting ampere turns to flow through 75.

The actuation of 12M closes 12Mb and opens 12Mc interrupting the supply of current to 11TR. 11TR drops out after a predetermined time interval. When 11TR drops out 11TRb closes and 11A is energized. At the same time 11TRa opens and the timing out of 12TR starts. Until 12TR times out, 12TRa remains open and 12A deenergized. When after 11TR has timed out, 11A is actuated and the part of the resistance in series with MA is short circuited. Subsequently when 12TR times out the remaining resistance in circuit with MA is short circuited and the resistance is at a minimum. The actuation of 12A also opens 12ab deenergizing coil 1FA1, closing contact 1FAa and opening contact 1FAb. This subjects the base windings 51 of MAM to the control of the variable resistor RH1. At this point in the operation, the resistor RH1 is set to introduce minimum resistance into the circuit of the base windings and thus the field MF is at maximum strength. The actuation of 12A also closes 12Ac conditioning the switch SW to be operated. The application of the maximum ampere turns to the base windings 51 counteracts the ampere turns of the bias windings 43 of amplifier MAM and causes current to be supplied to the field windings MEF1 setting the exciter ME at base excitation. Once the resistors 11 and 13 are shorted out by 11Aa and 12Aa the motor MO is then energized to base speed energizing the pliot generator PG to a potential corresponding to the base speed. Relay SV is then actuated closing contact SVa which conditions relay SVA to be actuated. Contacts SVAb and SVAc are then closed. In addition, SVAa is opened conditioning the acceleration feedback windings 47 to be energized.

As the motor MO builds up in speed the voltage between OL6 and OL5 increases counteracting the voltage across resistor 31 so that the alternator rises to base voltage.

To set the speed of the motor at a desired setting, the switch SW is moved to the "raise" position closing the circuit through the coil of relay RG. This opens the contact RGc conditioning the motor RHM to be energized and closes the energizing circuit through RGb and RGd so that the motor rotates to increase resistances RH1, RH2 and RH4 and to move resistance RH3 so that the voltage between its slider 25 and OL5 is decreased. The switch SW is held in the lower position until RH3 has the desired setting.

The ampere turns through the base windings 51 are then to an extent decreased, decreasing the output of ME and weakening field MF. In addition, the reference potential at J1 is greater than the potential between the slider of RH3 and OL5 and the output of the amplifier MAM is further decreased increasing the speed of the motor MO until the potential between the slider 25 of RH3 and OL5 balances the potential at J1. In addition, in the Alternator Regulator Unit the potential derivable from the pilot generator circuit between OL6 and OL5 exceeds the potential derivable from the rectifier REC3 through resistor 31 so that the ampere turns through the voltage windings 75 increases in a direction to increase the output of the amplifier MAA. This increases the excitation of the exciter AE increasing the field strength of the winding AF and increasing the voltage output of the alternator AA until the potential derivable from the alternator AA through the transformer PT balances the potential from pilot generator PG. Corresponding to the settings of the resistors RH1 through RH4 the motor MO now operates at a predetermined speed above base speed and the alternator at a predetermined frequency above base frequency. The output voltage of the alternator AA is compensated so that the ratio between the voltage and the frequency remains unchanged. The table motors may now be connected to be supplied by the alternator ALN.

If the alternator frequency is now to be decreased the switch SW may be moved to the lower position and in such an event, the converse of the above-described operation takes place.

The resistor RH2 corrects for the saturation of the field

MF. The resistor RH4 corrects for the change in gain of the alternator ALN over the range of frequency variation. In addition, ampere turns for the current windings 77 of the amplifier MAA are derived from transformer CT which depend on the loading of the alternator AA. These ampere turns increase the output of the amplifier MAA to correspond to the loading correcting for the loading. The acceleration feedback windings are energized through the capacitor 59 in series with them on the tendency of the motor MO to accelerate excessively. The resulting effect is to strengthen the exciter field MEF1 and to suppress this tendency. If the voltage of the exciter ME rises abruptly, the ampere turns through the rate feedback windings 49 increases reducing the output of the magnetic amplifier MAM and reducing the exciter output. A similar effect is produced on exciter AE by the rate feedback windings 81 of amplifier MAA.

Apparatus has been disclosed which serves to maintain the voltage of an alternator supplying a substantial number of alternating-current three-phase motors proportional to the frequency so that over the range of frequency which may be of the order of 3 to 1, the volts per cycle remain unchanged. While a preferred embodiment of this invention has been disclosed herein, many modifications thereof are feasible. This invention then is not to be restricted except insofar as is necessitated by the spirit of the prior art.

We claim as our invention:

1. Power supply apparatus including an alternator, a motor connected to said alternator to drive said alternator, means connected to said motor for setting the speed of said motor, and means connected to said alternator and to said motor and responsive to the relationship between the voltage output of said alternator and the speed of said motor for maintaining the said output at a predetermined speed substantially constant.

2. Power supply apparatus including an alternator, a motor connected to said alternator to drive said alternator, means connected to said motor for setting the speed of said motor, first means connected to said motor for deriving a first potential dependent on the speed of said motor, second means connected to said alternator for deriving a second potential dependent on the potential output of said alternator, and means connected to said first and second means and to said alternator for compensating for differences between said second and first potentials on the output of said alternator.

3. Power supply apparatus including an alternator, a motor connected to said alternator to drive said alternator, means connected to said motor for setting the speed of said motor, first means connected to said motor for deriving a first potential dependent on the speed of said motor, second means connected to said alternator for deriving a second potential dependent on the potential output of said alternator, third means connected to said speed setting means and to said second means for deriving a third potential less than said second potential by a magnitude dependent on the speed setting of said motor, said magnitude being greater the greater the speed of said motor, and means connected to said first, second and third means and to said alternator for compensating for differences between said third and first potentials on the output of said alternator.

4. Power supply apparatus including an alternator, a motor connected to said alternator to drive said alternator, means connected to said motor for setting the speed of said motor, first means connected to said motor for deriving a first potential dependent on the speed of said motor, second means connected to said alternator for deriving a second potential dependent on the potential output of said alternator, third means connected to said alternator for deriving a third potential dependent on the loading of said alternator, means connected to said first and second means and to said alternator for compensating for differences between said second and first potentials on the output of said alternator, and means connected to said third means and to said alternator for increasing the potential output of said alternator in dependence upon the loading of said alternator to correct for the droop of the volt-ampere characteristic of said alternator with loading.

5. A variable alternating-current supply including an alternator driven by a variable speed motor, first means connected to said alternator for deriving a first potential dependent on the potential output of said alternator, second means connected to said motor for deriving a second potential dependent on the speed of said motor, third means connected to said first and second means for deriving a potential substantially equal to the difference between said first and second potentials, and means connected to said third means and said alternator for setting the output of said alternator to compensate for said difference.

6. A variable alternating-current supply including an alternator driven by a variable speed motor, means connected to said motor for setting said motor at different speeds, first means connected to said alternator for deriving a first potential dependent on the potential output of said alternator, second means connected to said motor for deriving a second potential dependent on the speed of said motor, third means connected to said setting means and to said first means for deriving a third potential from said first potential by changing said first potential in accordance with the setting of said setting means, fourth means connected to said second and third means for deriving a fourth potential substantially equal to the difference of said second and third potentials, and means connected to said fourth means and to said alternator for setting the output of said alternator to compensate for the difference between said second and third potentials.

7. A variable alternating-current supply including an alternator driven by a variable speed motor, first means connected to said alternator for deriving a first potential dependent on the potential output of said alternator, second means connected to said motor for deriving a second potential dependent on the speed of said motor, third means connected to said first and second means for deriving a third potential substantially equal to the difference between said first and second potentials, means connected to said third means and to said alternator for setting the output of said alternator to compensate for said difference, fourth means connected to said alternator for deriving a fourth potential dependent on the loading of said alternator, and means connected to said fourth means and said alternator for increasing the output of said alternator as compensated in dependence upon said fourth potential.

8. A variable alternating-current supply including an alternator driven by a variable speed motor, means connected to said motor for setting said motor at different speeds, first means connected to said alternator for deriving a first potential dependent on the potential output of said alternator, second means connected to said motor for deriving a second potential dependent on the speed of said motor, third means connected to said first means for deriving a third potential from said first potential by changing said first potential in accordance with the setting of said setting means, means connected to said second and third means for comparing said second and third potentials, means connected to said comparing means and to said alternator for setting the output of said alternator to compensate for the difference between said second and third potentials, fourth means connected to said alternator for deriving a fourth potential dependent on the loading of said alternator, and means connected to said fourth means and to said alternator for increasing the output of said alternator as compensated in dependence upon said fourth potential.

9. A variable alternating-current supply including a variable-frequency alternator driven by a variable speed motor, means connected to said motor for setting said motor at a predetermined speed to set the output of said alternator at a predetermined frequency, and means connected to said setting means and to said alternator for compensating for changes in the output voltage of said alternator at said frequency in dependence upon said speed.

10. A variable alternating-current supply including a variable-frequency alternator driven by a variable speed motor, means connected to said motor for setting said motor at a predetermined speed to set the output of said alternator at a predetermined frequency, means connected to said setting means and to said alternator for compensating for changes in the output voltage of said alternator at said frequency in dependence upon said speed, means connected to said compensating means and to said alternator for correcting said compensation in dependence upon the setting of said speed to correct for changes in gain over the range of operation of said alternator, and means connected to said compensating means and to said alternator for correcting said compensation in dependence upon the loading of said alternator.

11. A variable alternating-current supply including an alternator driven by a variable speed motor, means connected to said motor for setting said motor at different speeds, first means connected to said alternator for deriving a first potential dependent on the potential ouput of said alternator, second means connected to said motor for deriving a second potential dependent on the speed of said motor, third means connected to said first and second means for deriving a third potential dependent on the difference between said first and second potentials, fourth means connected to said setting means and to said third means for varying said third potential inversely in dependence on the speed of said motor, and means connected to said alternator and to said third means for varying said output voltage of said alternator so as to reduce to substantially zero said third potential as varied by said fourth means.

References Cited in the file of this patent
UNITED STATES PATENTS

| | | |
|---|---|---|
| 1,804,126 | Stoller | May 5, 1931 |
| 2,309,558 | Weatherly | Jan. 26, 1943 |
| 2,340,875 | Gibbs | Feb. 8, 1944 |
| 2,349,618 | Graybrook et al. | May 23, 1944 |
| 2,607,028 | Gartner | Aug. 12, 1952 |
| 2,777,985 | Grady | Jan. 15, 1957 |